United States Patent [19]
Bang

[11] Patent Number: 5,694,272
[45] Date of Patent: Dec. 2, 1997

[54] SIGNAL TRANSMITTING DEVICE IN HARD DISK DRIVE

[75] Inventor: Kug-Hyeon Bang, Seoul, Rep. of Korea

[73] Assignee: SamSung Electronics Co., Ltd., Suwon, Rep. of Korea

[21] Appl. No.: 545,529

[22] Filed: Oct. 19, 1995

[30] Foreign Application Priority Data

Oct. 22, 1994 [KR] Rep. of Korea ............... 27050/1994

[51] Int. Cl.$^6$ .................................................. G11B 5/55
[52] U.S. Cl. .................................................. 360/106
[58] Field of Search ........................ 360/97.01, 97.03, 360/106, 97.02, 98.01; 384/9

[56] References Cited

U.S. PATENT DOCUMENTS

| | | | |
|---|---|---|---|
| 3,087,038 | 4/1963 | Bethke | 384/9 |
| 4,999,724 | 3/1991 | McAllister et al. | 360/97.03 |
| 5,270,887 | 12/1993 | Edwards et al. | 360/97.03 |
| 5,329,412 | 7/1994 | Stefansky | 360/97.01 |
| 5,454,724 | 10/1995 | Kloeppez et al. | 439/17 |
| 5,495,377 | 2/1996 | Kim | 360/106 |

Primary Examiner—Craig A. Renner
Assistant Examiner—David D. Davis
Attorney, Agent, or Firm—Robert E. Bushnell, Esq.

[57] ABSTRACT

A signal transmitting device, for transmitting a signal between a head and a printed circuit substrate of a hard disk drive having functions of storing and reproducing data to/from a recording medium, least one head for reading or writing data from/to the recording medium, an actuator for positioning the head at a desirable track above the recording medium, a spindle motor for rotating the recording medium at a constant speed, and a pivot bearing provided with one or more slots which are provided with a electrically conductive oil and a plurality of pads connected to the electrically conductive oil. The electrically conductive oil, by being provided within the slot, receives a head signal at ones of the plurality of pads, transmits the head signal from the pads to the electrically conductive oil in the slots, and then the electrically conductive oil therein transmits the head signal to ones of another plurality of pads connected to the electrically conductive oil in the slots to thereby enable transmission of the head signal between the head and the printed circuit substrate of the hard disk drive.

9 Claims, 5 Drawing Sheets

1

SIGNAL TRANSMITTING DEVICE IN HARD DISK DRIVE

CROSS REFERENCE TO RELATED APPLICATIONS

This application makes reference to, incorporates the same herein, and claims all benefits accruing under 35 U.S.C §119 from an application entitled Signal Transmitting Device In Hard Disk Drive earlier filed in the Korean Industrial Property Office on 22 Oct. 1994, which was duly assigned Ser. No. 27050/1994 by that Office.

BACKGROUND OF THE INVENTION

The present invention relates to a hard disk drive, and in particular, to a signal transmitting device for transmitting a signal between a head and a printed circuit substrate.

A hard disk drive suitable for use with a microcomputer, is constructed with a generally, rectangularly shaped base serving as a frame providing a major interior surface accommodating a plurality of circular disks coaxially mounted in a stack upon a spindle motor mounted on the base to provide a plurality of cylindrical base surfaces that serve as a memory into which binary information may be written and read, an actuator mounted upon the base by a pivot and a pivot bearing assembly for supporting the actuator on the base so it can freely rotate about the longitudinal axis of the pivot, a voice coil motor positioned to respond to electrical control signals and thereby arcuately displace a proximal end of the actuator, a multi-pin electrical terminal mounted to perforate a major interior surface of base, and a multi-lead flexible ribbon cable (flexible printed circuit) electrically coupling the cable of the actuator with corresponding terminal pins of the multi-pin electrical terminal. The actuator supports, at its distal end, a plurality of electromagnetic transducers commonly known as read/write actuator heads corresponding to the distinct separate cylindrical base surfaces of the disks that serve as memories. A cable having very small electrical conductors extends along the arm of the actuator and electrically couples the transducers to individual leads of the flexible printed circuit. Typically, the base surfaces of the disk are coated with a magnetically sensitive material that responds to fields created by corresponding ones of the actuator heads, to enable the actuator heads to either write bits of information at selected locations along tracks formed on the surface of a disk, or to read information from those tracks. Generally, a disk continuously rotates in a single direction while the voice coil motor acts upon the proximal end of the actuator arm to arcuately displace the proximal arm relative to a motor and thereby cause the distal ends of the actuator arm to radially position the heads along a corresponding base surface of the disk. A cover is mounted upon the upper surface of the base, to enclose the disks, actuator and voice coil motor, and to thereby seal the interior of the disk drive in order to protect the environment where the disks reside from dust and contaminants.

The heads "fly" over the corresponding base surfaces of the disks, and are normally spaced apart from those surfaces by a hydrodynamic air bearing formed by a cushion of air generated by the rapid rotation of the disks. The voice coil motor drives the proximal end of the actuator to move the heads to a data free parking or landing zone of the disks upon which the heads may rest without destroying information stored on the disks, when electrical power is turned off. Typically, the actuator quickly moves the heads to the parking zone in case of error or loss of power, and generally a crash stop is provided to block the proximal end and thereby limit further movement of the actuator arm once the heads reach their stop position within the parking zone.

The flexible printed circuit, i.e., the signal transmitting device, transmits a signal from a head to a printed circuit substrate by way of the multi-pin electrical terminal mounted on the base. The flexible printed circuit has been developed with a objective of reducing a bias force having a great influence on a servo of the actuator of the hard disk drive. Additionally, the layout of a flexible printed circuit has been developed with a objective of blocking external noise.

The bias force is acted as disturbance on the actuator servo of the hard disk drive. The actuator servo of the hard disk drive performs a track seeking mode and a track following mode. Here, the track seeking mode controls acceleration and deceleration of the head in a moving interval, and the track following mode is performed for settling, within a constant tolerance, the head when it has reached a desirable position. The bias force exerted on the actuator arm must be compensated for, either by adding to or subtracting from a bias force created by the voice coil motor when performing the track seeking or following modes. If the bias force is large, it becomes impossible to settle the head within the above mentioned constant tolerance. Therefore, studies for reducing the bias force have been executed mainly in the direction of reducing the elasticity of the flexible printed circuit by increasing its length or reducing its width and by enlarging a curvature of the path, i.e., the bending radius, of the flexible printed circuit.

Since the above-mentioned method for reducing the bias force requires a large space within the hard disk drive in order to accommodate the enlarged bending radius, it has been difficult to miniaturize the structure of the hard disk drive. An increase of the bending radius of the flexible printed circuit in a hard disk drive of reduced size is discussed in U.S. Pat. No. 4,965,684 to Frederick M. Stefansky and entitled Low Height Disk Drive, wherein the bending radius has been doubled as compared to conventional hard disk drives.

Further, as the length of the flexible printed circuit increases so as to increase the bending radius, a noise may be generated in transmitting a head signal, thereby reducing a signal-to-noise ratio (hereinafter, referred to as a —S/N ratio—). Also, as a coil connecting line of a voice coil motor becomes long, unnecessary power consumption and saturation voltage characteristics due to an increment of the resistance value may deteriorate. Moreover, when the size of the hard disk drive is reduced, a form factor is small, thereby increasing material cost.

Furthermore, in most cases where a head signal line and a voice coil motor driving line simultaneously exist in the flexible printed circuit, noise from the voice coil motor driving line may be generated, thereby reducing the S/N ratio of the signal of the head.

U.S. Pat. No. 5,325,252 entitled Magnetic Disc Apparatus Having Two Flexible Bending Members of an FPC Between a Fixing Portion and a Rocking Actuator Bent in Opposite Directions to Yuji Yagi, et al., on the other hand, discloses a flexible printed circuit having two members having bending portions bent in opposite directions from each other so that the reaction, i.e., bias, forces of two members of the flexible printed circuit are cancelled out with respect to each other. Additionally, in order to reduce the effects of noise between the head signals and the voice coil motor signals, the head signals and the voice coil motor signals are carried by respective ones of the flexible members. Accordingly, this arrangement allows for each flexible member of the flexible printed circuit to be narrower in width. A problem exists however in that there is extra cost in requiring two connectors at the actuator end and two connectors at the multi-pin electrical terminal mounted on the base for connecting the flexible printed circuit with the printed circuit substrate. Additionally, it is well known that the portions of the flexible printed members attached to the connectors is more rigid than the bending portions of the flexible printed members, thus providing two more locations capable of being broke due to over stressing of the flexible members by external forces.

SUMMARY OF THE INVENTION

It is therefore an object of the present invention to provide an improved hard disk drive.

It is another object to provide a structurally simple signal transmitter that minimizes generation of noise in a hard disk drive.

It is yet another object to provide a signal transmitting device in a hard disk drive in which the structure thereof is simple, no bias force exists, and no noise is generated, by using a pivot bearing provided with conductive oil.

These and other objects may be achieved according to the principles of the present invention with a pivot bearing constructed with one or more slots that are provided with an electrically conductive oil and a plurality of pads or electrodes connected to the conductive oil. The conductive oil, by being provided within the slot, receives a head signal at ones of the plurality of pads, transmits the head signal from the pads to the conductive oil in the slots, and then the conductive oil therein transmits the head signal to other ones of the plurality of pads connected to the conductive oil in the slots to enable transmission of the head signal between a head and a printed circuit substrate, i.e., printed circuit board, of the hard disk drive.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
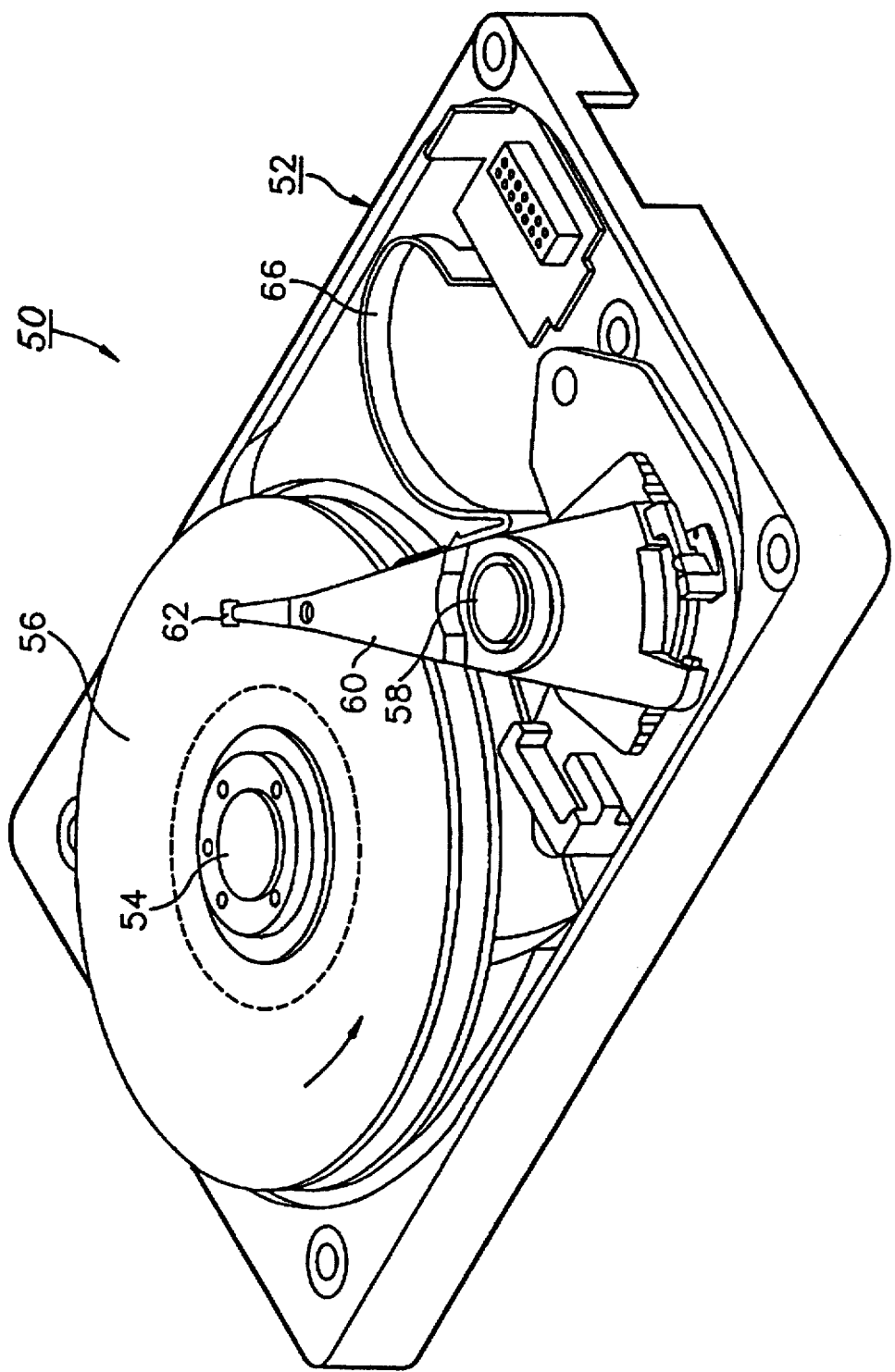
FIG. 1 is a perspective view of a hard disk drive illustrating a typical layout of a flexible printed circuit within the hard disk drive.
Figure 2:
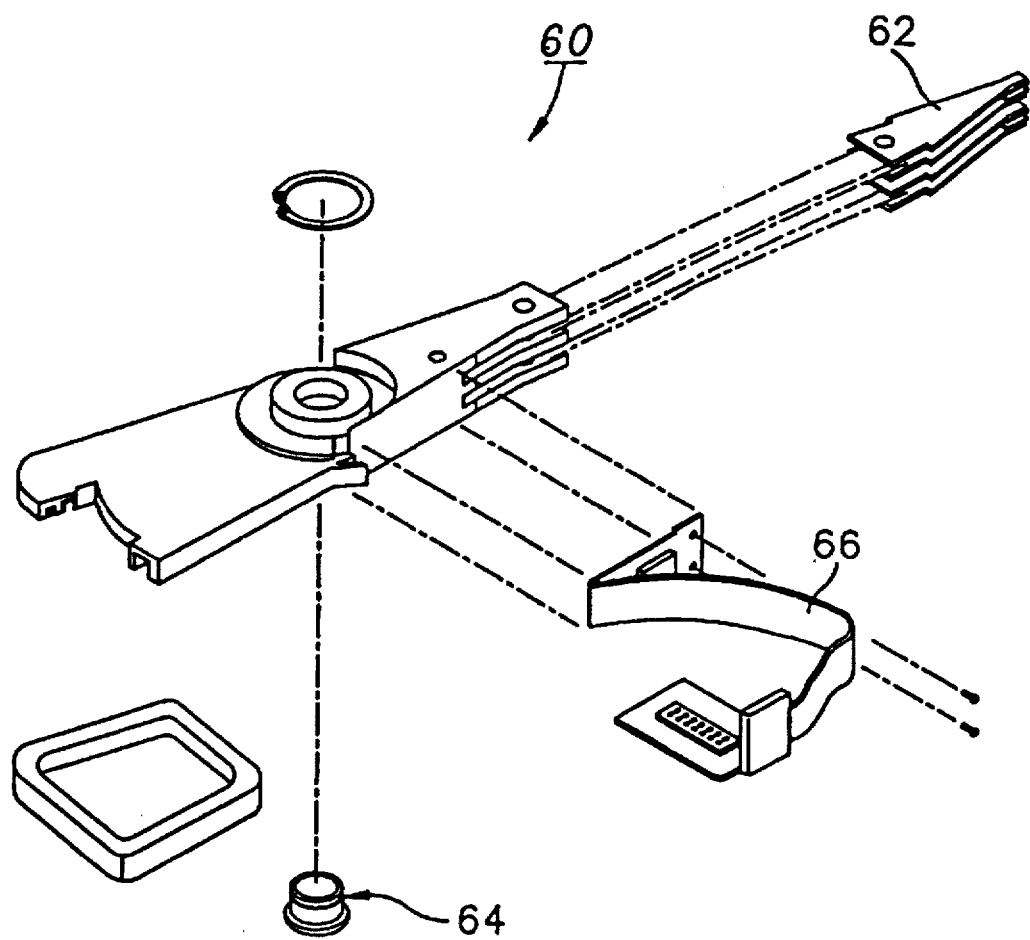
FIG. 2 is a separated perspective view illustrating the flexible printed circuit and actuator of FIG. 1.

Referring now to FIG. 1, a hard disk drive 50 has a head 62 which records and reproduces data to/from a recording medium 56, an actuator 60 which moves head 62 to a position of recording and reproducing data, a spindle motor 54 which rotates recording medium 56 at a constant speed, a pivot and a pivot bearing assembly 58 for supporting actuator 60 on a base 52, base 52 supports the elements described above, and a flexible printed circuit 66, namely, a signal transmitting device, which transmits a signal from head 62 to a printed circuit substrate (not shown).

Figure 7:
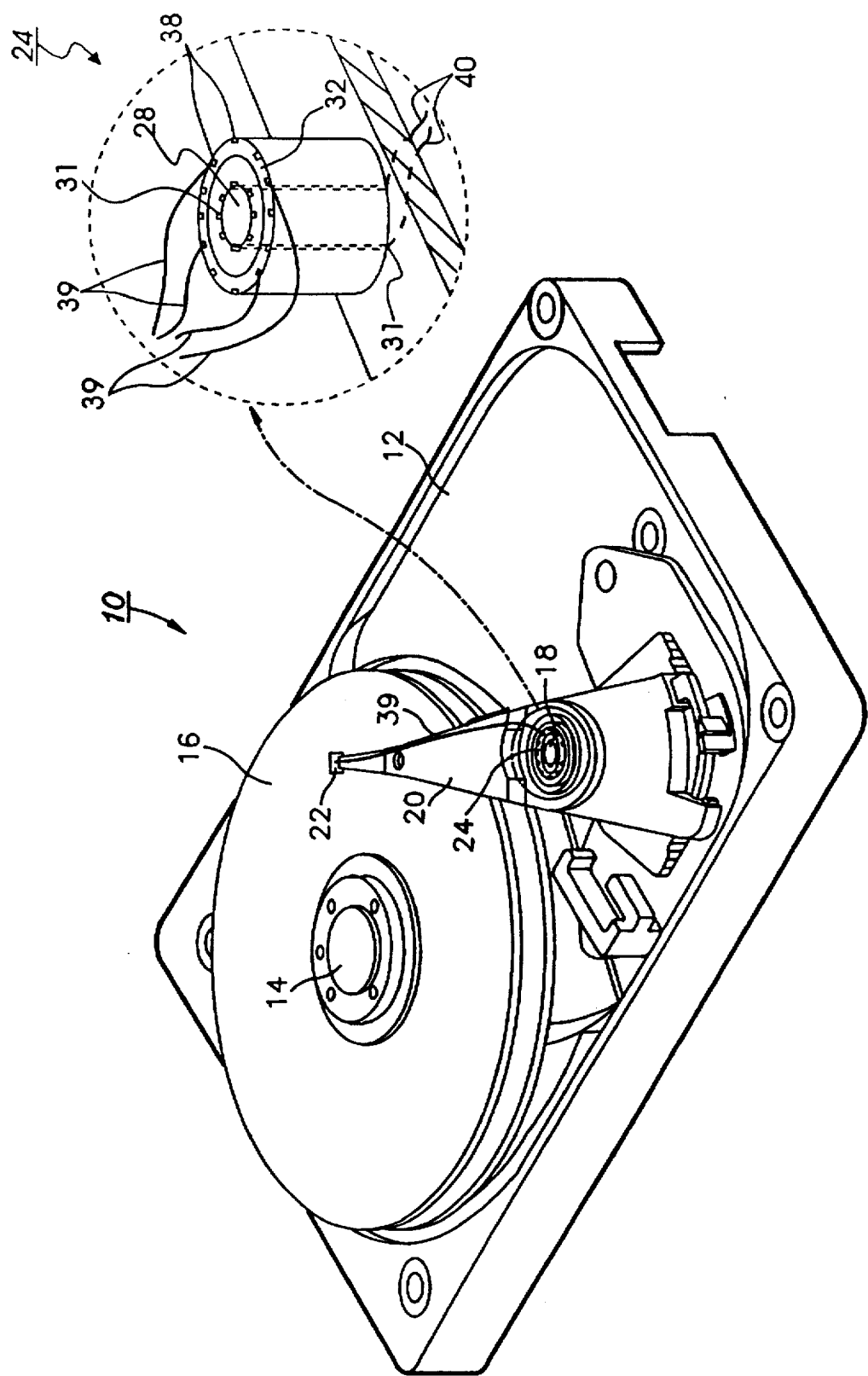
FIG. 7 is a perspective view illustrating a hard disk drive having a signal transmitting device constructed according to the principles of the present invention.

A hard disk drive 10 having functions of recording and reproducing data, as shown in FIG. 7, has a signal transmitting device according to the present invention and is comprised of a recording medium 16 for storing data, one or more heads 22 for storing and reading data on/from recording medium 16, an actuator 20 which positions head 22 above a desirable track of recording medium 16, and a spindle motor 14 for rotating recording medium 16 at a constant speed. Also, hard disk drive 10 includes a base 12 for supporting actuator 20 and spindle motor 14.

Actuator 20 is rotatably attached to base 12 and centered upon a pivot 18. A pivot bearing 24 is inserted between pivot 18 and actuator 20 so as to enable actuator 12 to be smoothly rotated on pivot 18.

Figures 3A, 3B:
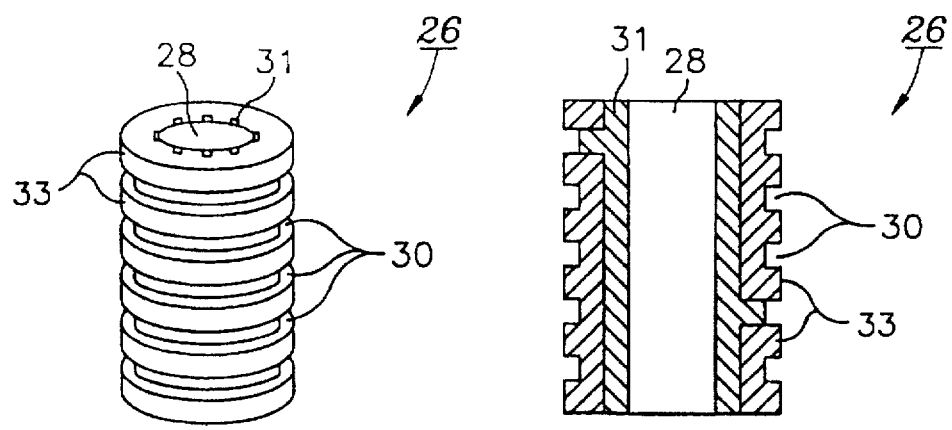
FIG. 3A is a perspective view illustrating an inner rim of the pivot bearing according to the principles of the present invention.
FIG. 3B is a sectional view of the pivot bearing of FIG. 3A.
Figure 4:
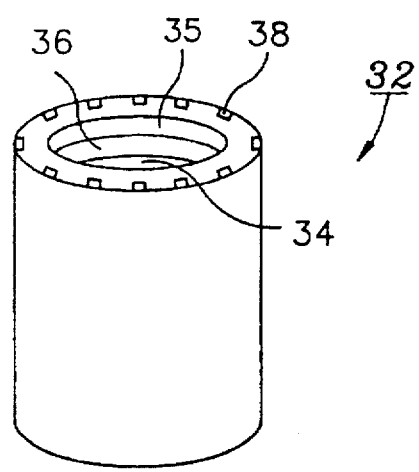
FIG. 4 is a perspective view illustrating an outer rim of the pivot bearing according to the principles of the present invention.

Pivot bearing 24 is composed of an inner rim 26 and an outer rim 32, FIGS. 3A and 4. Inner rim 26 of pivot bearing 24 has a hollow right cylindrical form and includes, as shown in FIGS. 3A and 3B, through hole 28 which will be assembled to pivot 18, at least one or more parallel annular slots 30 formed in inner rim 26 by cutting annular grooves into the outer cylindrical surface of inner rim 26, and those portions of the outer cylindrical surface not removed form annular rings 33. Slots 30 hold, when the inner and outer rims are joined, an electrically conductive oil. One or more pads 31, preferably made of copper, extends from one end of hole 28 to the opposite end of hole 28, wherein each pad 31 is provided with a protrusion aligned with and extending into a corresponding slots 30 to provide a connection to the electrically conductive oil provided within slots 30. At room temperature and throughout the range of operating temperatures or the hard disk drive, the electrically conductive oil maintains a liquid phase.

Figure 5:
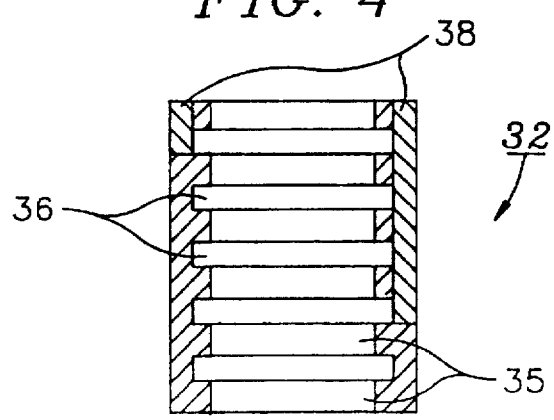
FIG. 5 is a sectional view of the pivot bearing of FIG. 4.

Outer rim 32 of pivot bearing 24 includes, as shown in FIGS. 4 and 5, a through hole 34 for receiving inner rim 26, at least one or more slots 36 formed by cutting annular grooves into the inner surface of through hole 34 thereby leaving remaining portions 35 of the inner surface of through hole 34. The slots 36 hold electrically conductive oil when the inner and outer rims are joined. One or more pads 38, preferably made of copper, are provided to extend from the top most remaining portion 35, which is the outer surface portion of one end of the cylinder forming outer rim 32, to corresponding slots 36 to provide a connection to the electrically conductive oil provided within slots 36. As illustrated in FIG. 5, pads 38 have different lengths respectively corresponding to the distance of each slot 36 from the outer surface of the top most remaining portion 35.

In one arrangement, the number of pads 31 correspond to the number of slots 30 provided in inner rim 26, and the number of pads 38 correspond to the number of slots 36 in outer rim 32. In another arrangement there may be more than one pad per slot and each pad would be connected to a corresponding one of the plural heads used for reading and reproducing information to/from the disks.

When the inner rim 26 and the outer rim 32 are joined to form the pivot bearing 24, slots 30 and 36 are aligned, and rings 33 and remaining portions 35 are tightly adjoined so that the electrically conductive oil remains within respective slots 30 and 36. In other words, the abutment between rings 33 and remaining portions 35 seal the electrically conductive oil in slots 30 and 36.

Referring to FIG. 7, actuator 20 has one or more head cables 39, depending upon the number of heads. Cable 39 has a plurality of wires for transmitting signals from head 22 with to corresponding ones of pads 38 on outer rim 32. Each of the pads 31 on inner rim 26 of pivot bearing 24 is connected with a printed circuit substrate (not shown) by corresponding wires of cable 40.

Figure 6:
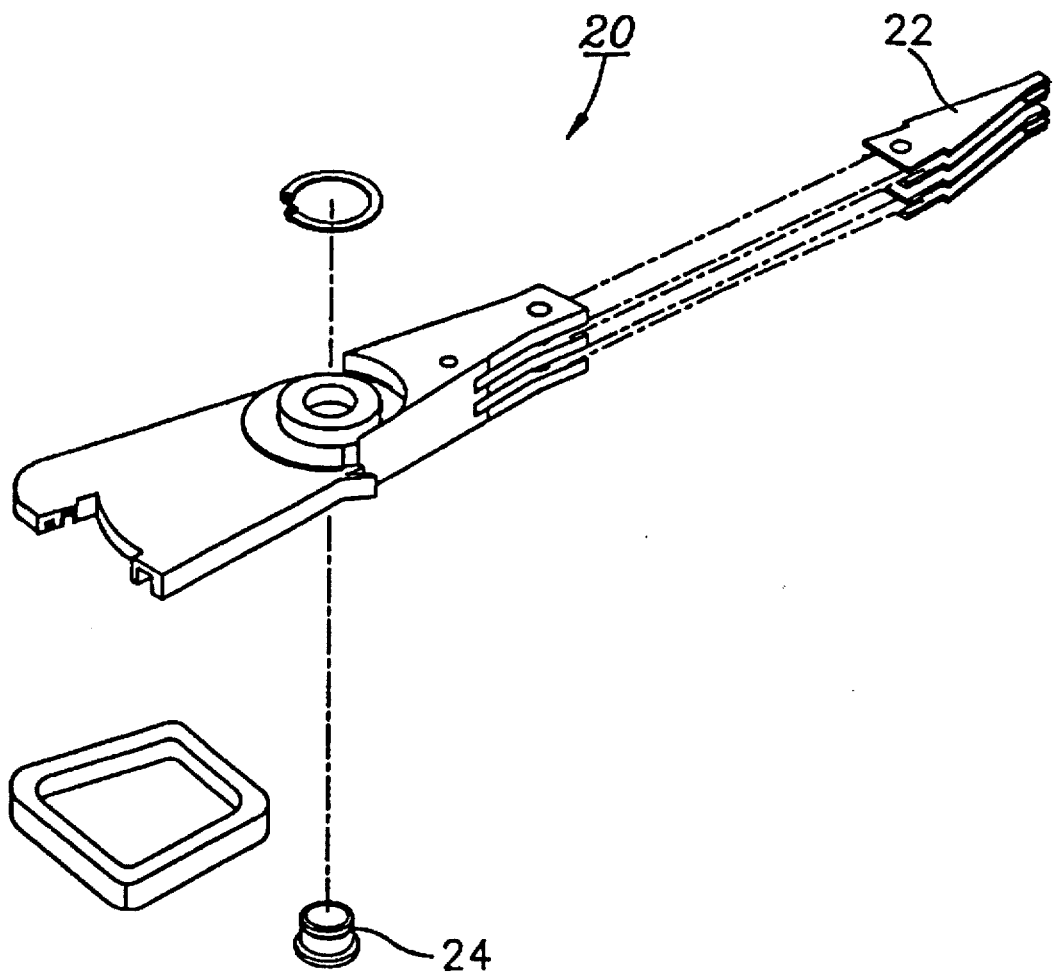
FIG. 6 is a separated perspective view illustrating an actuator to which a pivot bearing having a signal transmitting device constructed according to the principles of the present invention is assembled.

The signal transmitting device of hard disk drive 10 according to the present invention and constructed as described above is formed of a pivot bearing 24 having outer rim 32 affixed to inner rim 26 and electrically conductive oil is provided within each of slots 30 and 36. Pivot bearing 24, as shown in FIG. 6, is assembled to actuator 20. The outer cylindrical surface of pivot 18 is affixed to the inner surface of through hole 28 of inner rim 26 and pivot 18 is attached to base 12, as shown in FIG. 7.

The signal transmitting device of hard disk drive 10 according to the present invention and constructed as described above provides a signal transmission path between head 22, which records and reproduces data on recording medium 16, and a printed circuit substrate (not shown). A signal generated by head 22 is transmitted to pads 38 on outer rim 32 of pivot bearing 24 along head cable 39. The signal is then transmitted from pads 38 on outer rim 32 to pads 31 on inner rim 26 of pivot bearing 24 via the electrically conductive oil provided within slots 30 and 36. The signal transmitted to pads 31 on inner rim 26 is then transmitted to the printed circuit substrate (not shown) along cable 40. Conversely, a signal output from the printed circuit substrate (not shown) is transmitted to pads 31 by cable 40. The signal transmitted to pads 31 is transmitted to pads 38 via the electrically conductive oil in slots 30 and 36, and the signal transmitted to pads 38 is transmitted to head 22 via head cable 39.

Accordingly, the signal which is recorded or reproduced by head 22 is transmitted from or to the printed circuit substrate (not shown) of the hard disk drive.

As explained above, since the signal transmitting device of hard disk drive 10 according to the present invention uses pivot bearing 24 provided with the electrically conductive oil, and a cable 40 having individual leads (wires) connected to pads 31 of inner rim 26 there is no flexible printed circuit in use. Accordingly, since cable 40 will not provide a bias force to actuator 20, there are advantages in simplifying the device and generating no bias force. Further, there will be a separate cable (not shown) connecting the printed circuit substrate (not shown) to the voice coil motor, thus there will be no noise generated from the voice coil motor to the head signal line.

While there have been illustrated and described what is to he considered to be the preferred embodiment of the present invention, it will be understood by those skilled in the art that various changes and modifications may be made, and equivalents may be substituted for elements thereof without departing from the true scope of the present invention. For example, O-rings and mating grooves therefor could be provided in rings 33 and portions 35 to further ensure that no electrically conductive oil seeps from one slot to another. Further, cable 40 could extend from the bottom portion of pads 31 through the base and then be connected to the printed circuit substrate. Therefore, it is intended that the present invention not be limited to the particular embodiment disclosed as the best mode contemplated for carrying out the present invention, but that the present invention includes all embodiments falling within the scope of the appended claims.

What is claimed is:

1. A signal transmitting device of a hard disk drive having a printed circuit substrate, said signal transmitting device comprising:

a recording medium for storing data via a magnetic recording system;

one or more heads for storing and picking up said data on said recording medium;

an actuator rotatably mounted to a pivot, said actuator positioning at least one of said heads over a desired track on said recording medium;

a spindle motor for rotating said recording medium at a constant speed; and a pivot bearing mounted on said pivot for supporting said actuator on a base, said pivot bearing being provided with electrically conductive unctuous material, said electrically conductive unctuous material providing a transmission medium through which a signal from at least one of said heads is transmitted to the printed circuit substrate of said hard disk drive, said pivot bearing comprising:

an inner rim of cylindrical shape having a hollow core and a plurality of annular grooves formed in an exterior surface thereof, said hollow core being formed to fit over said pivot;

an outer rim of cylindrical shape having an exterior surface of constant diameter and a hollow core, and a plurality of annular grooves formed in the surface of said hollow core of said outer rim;

said outer rim and said inner rim being joined by placing said inner rim in said hollow core of said outer rim so as to align said plurality of annular grooves of said inner with said plurality of annular grooves of said outer rim;

said electrically conductive unctuous material being provided within each of said aligned plurality of annular grooves; and a plurality of pads disposed along an end portion of said inner rim and an end portion of said outer rim, said pads extending from said end portions of said inner and outer rims to corresponding ones of said annular grooves of said inner and outer rims, respectively, said pads being connected to said electrically conductive unctuous material for providing a transmission path for an electrical signal transmitted between said heads and said printed circuit substrate.

2. A signal transmitting device of a hard disk drive having a recording medium for storing data, at least one head for reading and writing data on said recording medium, an actuator for positioning said head above a desirable track on said recording medium, a pivot for rotatably supporting said actuator on a base of said hard disk drive, a spindle motor for rotating said recording medium at a constant speed, and a printed circuit substrate for communicating with said head in response to a head signal transmitted therebetween, said signal transmitting device comprising:

a pivot bearing mounted to said pivot, said pivot bearing comprising:
  an inner rim of cylindrical shape having a hollow core and a plurality of annular grooves formed in an exterior surface thereof, said hollow core being formed to fit over said pivot;
  an outer rim of cylindrical shape having a hollow core, a plurality of annular grooves formed in the surface of said hollow core of said outer rim and a smooth exterior surface;
  said outer rim and said inner rim being joined by placing said inner rim in said hollow core of said outer rim so as to align said plurality of annular grooves of said inner and outer rims;
  electrically conductive oil provided within each of said aligned plurality of annular grooves; and
  a plurality of pads disposed along an end portion of said inner rim and an end portion of said outer rim, said pads being connected to the electrically conductive oil for providing a transmission path through which said head signal is transmitted between said head and said printed circuit substrate.

3. The signal transmitting device as set forth in claim 2, further comprising:
  said pads of said inner rim each extending from said end portion of said inner rim to an opposite end portion of said inner rim, each of said pads having a protrusion aligned with and extending into corresponding ones of said annular grooves of said inner rim for contacting said electrically conductive oil; and
  said pads of said outer rim each extending from said end portion of said outer rim to corresponding ones of said annular grooves of said outer rim.

4. The signal transmitting device as set forth in claim 2, further comprising:
  a first cable connected between at least one of said heads and said pads of said outer rim; and
  a second cable connected between said pads of said inner rim and said printed circuit substrate.

5. The signal transmitting device as set forth in claim 3, further comprising:
  a fast cable connected between at least one of said heads and said pads of said outer rim; and
  a second cable connected between said pads of said inner rim and said printed circuit substrate.

6. A signal transmitting device of a hard disk drive having a printed circuit substrate, a recording medium for storing data via a magnetic recording system, one or more heads for storing and picking up said data on said recording medium, and a spindle motor for rotating said recording medium at a constant speed, said signal transmitting device comprising:
  an actuator rotatably mounted to a pivot, said actuator positioning at least one of said heads over a desired track on said recording medium; and
  a pivot bearing mounted on said pivot for supporting said actuator on a base, said pivot bearing being provided with electrically conductive oil, said electrically conductive oil providing a transmission medium through which a signal from at least one of said heads is transmitted to the printed circuit substrate of said hard disk drive, said pivot bearing comprising:
    an inner rim of cylindrical shape having a hollow core and a plurality of annular grooves formed in an exterior surface thereof, said hollow core being formed to fit over said pivot;
    an outer rim of cylindrical shape having a hollow core, a plurality of annular grooves formed in the surface of said hollow core of said outer rim and an exterior surface of constant diameter;
    said outer rim and said inner rim being joined by placing said inner rim in said hollow core of said outer rim so as to align said plurality of annular grooves of said inner and outer rims;
    said electrically conductive oil being provided within each of said aligned plurality of annular grooves; and
    a plurality of pads disposed along an end portion of said inner rim and an end portion of said outer rim, said pads extending from said end portions of said inner and outer rims to corresponding ones of said annular grooves of said inner and outer rims, respectively, said pads being connected to the electrically conductive oil and providing a transmission path for an electrical signal transmitted between said heads and said printed circuit substrate.

7. A signal transmitting device of a hard disk drive having a printed circuit substrate, a recording medium for storing data via a magnetic recording system, one or more heads for storing and picking up said data on said recording medium, and a spindle motor for rotating said recording medium at a constant speed, said signal transmitting device comprising:
  an actuator rotatably mounted to a pivot, said actuator positioning at least one of said heads over a desired track on said recording medium; and
  a pivot bearing mounted on said pivot for supporting said actuator on a base, said pivot bearing being provided with electrically conductive oil, said electrically conductive oil providing a transmission medium through which a signal from at least one of said heads is transmitted to the printed circuit substrate of said hard disk drive, said pivot bearing comprising:
    an inner rim and an outer rim, said inner rim and said outer rim each comprising one or more annular grooves, each of said annular grooves of said inner rim being aligned with each of said annular grooves of said outer rim, each of said aligned annular grooves accommodating said electrically conductive oil for transmitting said signal from at least one of said heads to said printed circuit substrate of said hard disk drive; and
    a plurality of pads disposed along an end portion of said inner rim and an end portion of said outer rim, said pads being connected to said electrically conductive oil for providing a transmission path through which said head signal is transmitted between said head and said printed circuit substrate.

8. The signal transmitting device as set forth in claim 7, further comprising:
  said pads of said inner rim each extending from said end portion of said inner rim to an opposite end portion of said inner rim, each of said pads having a protrusion aligned with and extending into corresponding ones of said annular grooves of said inner rim for contacting said electrically conductive oil; and
  said pads of said outer rim each extending from said end portion of said outer rim to corresponding ones of said annular grooves of said outer rim.

9. The signal transmitting device as set forth in claim 7, further comprising:
  a first cable connected between at least one of said heads and said pads of said outer rim; and
  a second cable connected between said pads of said inner rim and said printed circuit substrate.

* * * * *